(12) United States Patent
Athalye et al.

(10) Patent No.: US 7,810,846 B2
(45) Date of Patent: Oct. 12, 2010

(54) ELECTROSTATIC DISSIPATION SOLUTION FOR ANGLED FUEL PORT OF A FUEL SUPPLY UNIT

(75) Inventors: Parag Athalye, Auburn Hills, MI (US); John Patrick Wattai, Rochester Hills, MI (US); Matthias Nederegger, Rochester Hills, MI (US); Stephane Seps, Detroit, MI (US)

(73) Assignee: Continental Automotive Systems US, Inc., Auburn Hills ( * ) Notice: Subject to any disclaimer, the term of this patent is extended or adjusted under 35 U.S.C. 154(b) by 473 days.

(21) Appl. No.: 11/889,474

(22) Filed: Aug. 14, 2007

(65) Prior Publication Data

US 2008/0042437 A1 Feb. 21, 2008

Related U.S. Application Data

(60) Provisional application No. 60/839,341, filed on Aug. 21, 2006.

(51) Int. Cl.
*F16L 41/00* (2006.01)
(52) U.S. Cl. .................. 285/201; 285/55; 285/189; 285/192; 285/202; 285/423
(58) Field of Classification Search .............. 285/54, 285/55, 222, 269, 241, 242, 252, 257, 416, 285/423, 189, 192, 201, 202; 174/650, 660, 174/17 R, 17 F, 17 GF
See application file for complete search history.

(56) References Cited

U.S. PATENT DOCUMENTS 6,402,205 B1 * 6/2002 Rose et al. ............... 285/319
6,442,012 B2 * 8/2002 Koike et al. ............. 361/212
2003/0107218 A1 * 6/2003 Anderson et al. .......... 285/360
2005/0184515 A1 * 8/2005 Isayama et al. ......... 285/288.1

OTHER PUBLICATIONS

Co-pending U.S. Appl. No. 11/889,473, filed Aug. 14, 2007 of Athalye et al.
Co-pending U.S. Appl. No. 11/826,280, filed Jul. 13, 2007 of Athalye et al.
Co-pending U.S. Appl. No. 11/889,472, filed Aug. 14, 2007 of Athalye et al.
Co-pending U.S. Appl. No. 11/822,649, filed Jul. 9, 2007 of Athalye.
Co-pending U.S. Appl. No. 11/889,468, filed Aug. 14, 2007 of Athalye et al.

* cited by examiner

*Primary Examiner*—James M Hewitt
*Assistant Examiner*—Jay R Ripley

(57) ABSTRACT

A flange structure (10') for a fuel supply unit of a vehicle includes at least one non-electrically conductive plastic fuel port (16') having first and second ends. A non-electrically conductive plastic flange (20') is integral with the fuel port between the first and second ends. The flange is constructed and arranged to be coupled with a fuel tank of a vehicle. Electrically conductive grounding structure (32) is associated with the fuel port and has an elongated portion (36) extending within the fuel port so as to be exposed to fuel, and an end (40) connected with the elongated portion. An electrically conductive hose (30) is coupled with the first end of the fuel port and is in contact with the end of the grounding structure thereby defining a discharge path such that static electricity generated when fuel flows through the fuel port can be dissipated through the discharge path.

12 Claims, 2 Drawing Sheets

ELECTROSTATIC DISSIPATION SOLUTION FOR ANGLED FUEL PORT OF A FUEL SUPPLY UNIT

This application claims the benefit of the earlier filing date of U.S. Provisional Application No. 60/839,341, filed on Aug. 21, 2006, which is hereby incorporated by reference into this specification.

FIELD OF THE INVENTION

The invention relates to fuel supply units for automobile vehicles and, more particularly, to providing a static electricity discharge path in a fuel port of a non-conductive flange of a fuel supply unit.

BACKGROUND OF THE INVENTION

With reference to FIG. 1, a typical fuel supply unit for a vehicle includes flange structure, generally indicated at 10, including a plastic flange 20 configured to be sealed to a wall of a fuel tank. The flange structure 10 is interconnected with a fuel pump assembly 12 by a pair of metal struts 14. The flange structure 10 also includes various ports 16 that provide fuel pathways into and out of the fuel tank. The ports 16 are connected with the fuel pump 12 to supply fuel to an engine, but the connecting hoses are not shown in FIG. 1.

Recently, there has been a greater focus on Electro Static Dissipation (ESD) in such fuel supply systems. It is known that as fuel flows through various components of the fuel supply system, such as the fuel pump assembly, the fuel filter, and various valving and tubing, there is the potential for static electricity to be generated in the various conductive components of the fuel supply system. To dissipate this static electricity, fuel supply systems electrically ground the components through electrical interconnection.

For example, as shown in FIG. 1, some systems employ a separate cable harness 18 which grounds through the pump negative. Other systems employ grounding clips (not shown) that touch an inline filter.

There is a need provide for ESD of fuel ports in a fuel supply unit.

SUMMARY OF THE INVENTION

An object of the invention is to fulfill the need referred to above. In accordance with the principles of the present invention, this objective is obtained by providing a flange structure for a fuel supply unit of a vehicle. The flange structure includes at least one non-electrically conductive plastic fuel port having first and second ends. A non-electrically conductive plastic flange is integral with the fuel port between the first and second ends. The flange is constructed and arranged to be coupled with a fuel tank of a vehicle. Electrically conductive grounding structure is associated with the fuel port. The grounding structure has an elongated portion extending within the fuel port so as to be exposed to fuel, and an end connected with the elongated portion. An electrically conductive hose is coupled with the first end of the fuel port and is in contact with the end of the grounding structure thereby defining a discharge path such that static electricity generated when fuel flows through the fuel port can be dissipated through the discharge path.

In accordance with another aspect of the disclosed embodiment, a method of grounding a fuel port of a flange structure for a fuel supply unit of a vehicle provides at least one non-conductive plastic fuel port having first and second ends, and a non-electrically conductive plastic flange integral with the fuel port between the first and second ends. The method insert molds an electrically conductive grounding structure with respect to the fuel port. The grounding structure has an elongated portion extending within the fuel port so as to be exposed to fuel, and an end connected with the elongated portion. An electrically conductive hose is coupled with the first end of the fuel port so as to be in contact with the end of the grounding structure thereby defining a discharge path such that static electricity generated when fuel flows through the fuel port can be dissipated through the discharge path.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
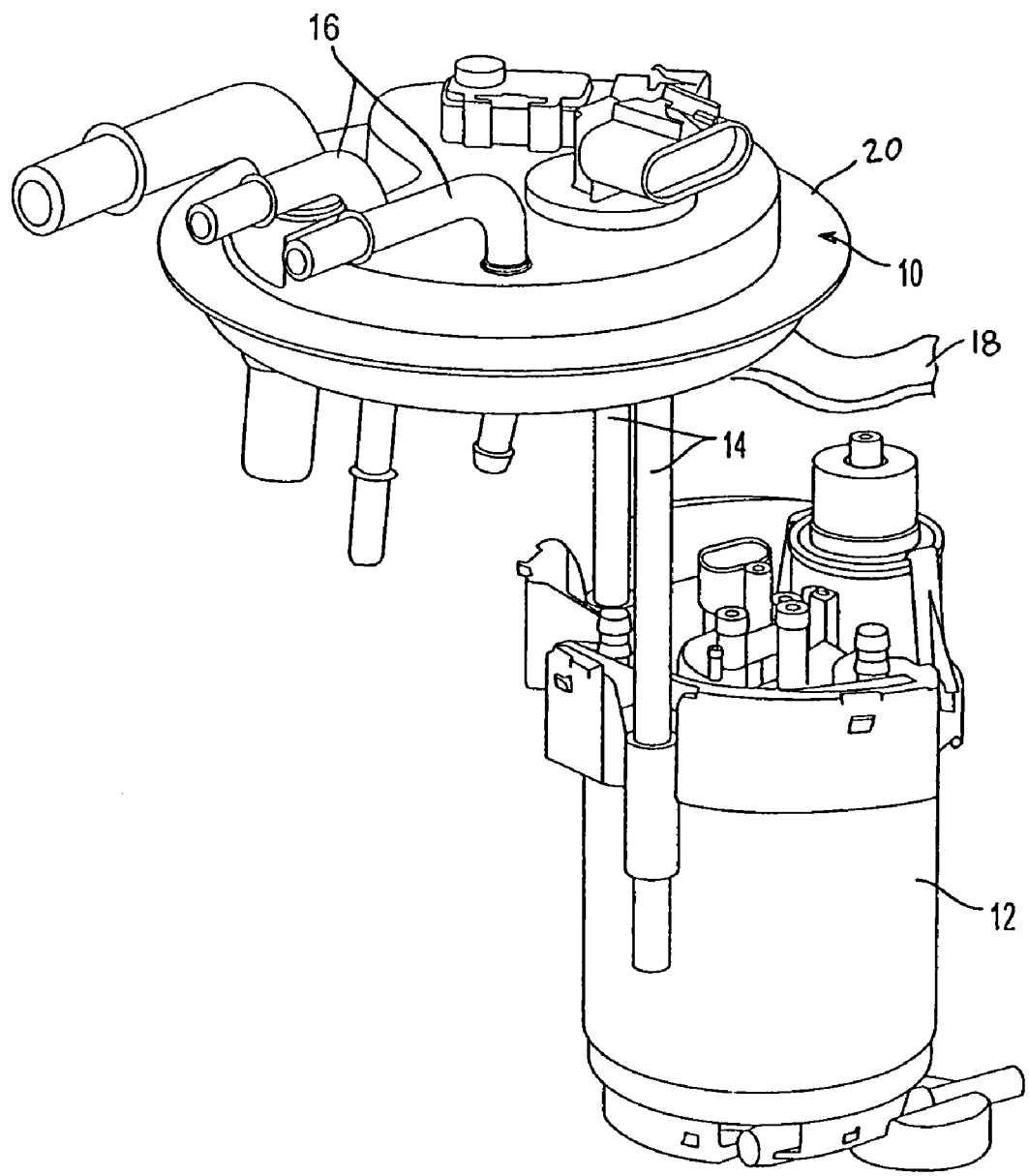
FIG. 1 is a view of conventional fuel supply unit of a vehicle.
Figure 2:
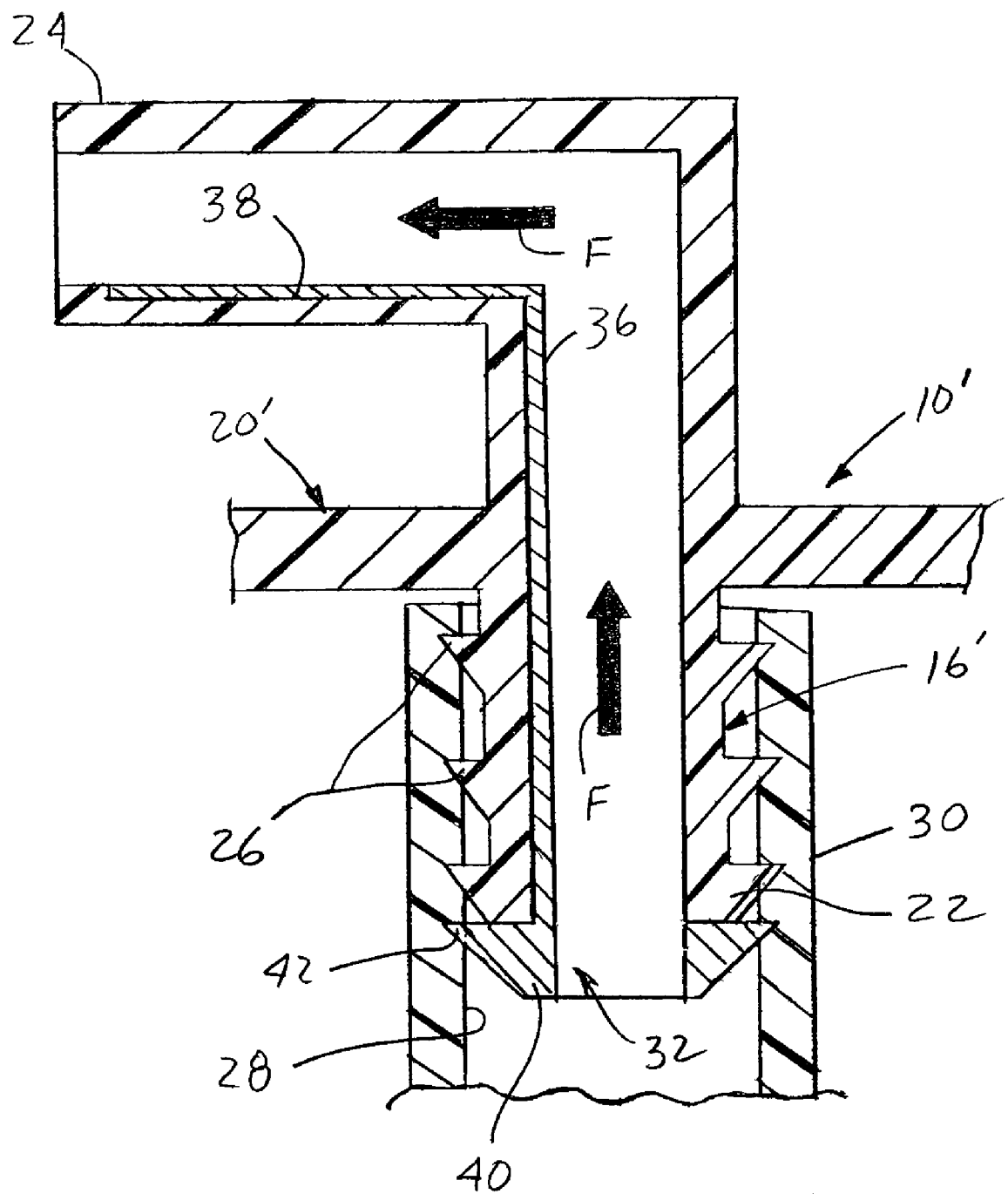
FIG. 2 is a partial sectional view of a flange structure including a flange, a fuel port and a hose provided in accordance with an embodiment of the invention.

With reference to FIG. 2, a portion of a flange structure, generally indicated at 10', is shown in accordance with the principles of an embodiment of the invention. The flange structure 10' is similar to the flange structure 10 shown in FIG. 1, employed in a fuel supply unit of a vehicle. The flange structure 10' includes at least one fuel port, generally indicted at 16', and a flange, generally indicated at 20'. The flange 20' is preferably molded from non-electrically conductive plastic together with the fuel port 16'.

The fuel port 16' has a first end 22 accessible inside a fuel tank (not shown) and a second end 24 that is accessible outside of the flange 20' and thus outside of the fuel tank. Barb structure is associated with the end 22. In the embodiment, the barb structure is preferably in the form of at least one (three shown) annular barbs 26. The barbs 26 engage an inner surface 28 of an electrically conductive hose 30 that is constructed and arranged to be connected with a fuel pump filter (not shown) and/or a fuel pump outlet (not shown). The hose 30 is preferably of electrically conductive plastic.

The fuel port 16' includes grounding structure, generally indicated at 32. In the embodiment shown in FIG. 2, the grounding structure 32 is an electrically conductive, preferably metal member that is insert molded with respect to the fuel port 16'. Although a metal grounding structure 32 is disclosed, the grounding structure can be of any electrically conductive material, such as conductive plastic. The grounding structure 32 has an elongated portion 36 extending along a surface 38 of the fuel port 16' so as to be exposed to fuel F that flows in the fuel port 16'. The grounding structure 32 also includes an end 40 that is connected with (preferably integral with) the elongated portion 36. The end 40 defines a free end of the fuel port 16' and is thus angled, permitting ease of insertion into the hose 30. The end 40 includes a barb 42 that engages with the inner surface 28 of the conductive hose 30. Thus, an electrostatic dissipation path is provided between the fuel port 16' and the hose 30. Since the hose 30 is electrically connected with the pump filter or fuel pump outlet, static electricity, generated by fuel flowing in the fuel port 16' can be dissipated through the conductive hose 30 to the pump filter or pump outlet to the pump negative.

Although only one fuel port 16' is shown in FIG. 2, it can be appreciated that other similar ports, with the associated connection with the flange 20' and hose 30 can be provided.

Hence, by employing a conductive fuel port 16', ESD can be achieved and by providing the barbs 26, a fuel leakage barrier is provided.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A flange structure for a fuel supply unit of a vehicle, the flange structure comprising:
    at least one non-electrically conductive plastic fuel port having first and second ends, a non-electrically conductive plastic flange integral with the fuel port between the first and second ends, the flange being constructed and arranged to be coupled with a wall of a fuel tank of a vehicle,
    electrically conductive grounding structure associated with the fuel port, the grounding structure having an elongated member extending within the fuel port so as to be exposed to fuel, and a hose-receiving end connected with the elongated member,
    an electrically conductive hose having a first end coupled with the first end of the fuel port and in contact with the hose-receiving end of the grounding structure thereby defining a discharge path such that static electricity generated when fuel flows through the fuel port can be dissipated through the discharge path to structure coupled with a second end of the hose,
    wherein the first end of the fuel port includes barb structure engaged with an inner surface of the hose,
    wherein the grounding structure is a single electrically conductive member insert molded with respect to the fuel port, and
    wherein the elongated member of the grounding structure engages only part of an internal wall of the fuel port.

2. The flange structure of claim 1, wherein the elongated member and the hose-receiving end of the grounding structure are integral.

3. The flange structure of claim 1, wherein the hose-receiving end of the grounding structure is engaged with the first end of the fuel port.

4. The flange structure of claim 3, wherein the hose-receiving end of the grounding structure is angled to facilitate insertion into the hose.

5. The flange structure of claim 4, wherein the hose-receiving end of the grounding structure includes an annular barb that is engaged with an inner wall of the hose.

6. The flange structure of claim 1, wherein the grounding structure is made entirely of metal.

7. A flange structure for a fuel supply unit of a vehicle, the flange structure comprising:
    at least one non-electrically conductive plastic fuel port having first and second ends,
    a non-electrically conductive plastic flange integral with the fuel port between the first and second ends, the flange being constructed and arranged to be coupled with a wall of a fuel tank of a vehicle,
    means for grounding associated with the fuel port, the means for grounding being electrically conductive and having an elongated member extending within the fuel port so as to be exposed to fuel, and a hose-receiving end connected with the elongated member,
    an electrically conductive hose having a first end coupled with the first end of the fuel port and in contact with the hose-receiving end of the means for grounding thereby defining a discharge path such that static electricity generated when fuel flows through the fuel port can be dissipated through the discharge path to structure coupled with a second end of the hose,
    wherein the first end of the fuel port includes barb structure engaged with an inner surface of the hose,
    wherein the means for grounding is a single electrically conductive member insert molded with respect to the fuel port, and
    wherein the elongated member of means for grounding engages only part of an internal wall of the fuel port.

8. The flange structure of claim 7, wherein the elongated member and the hose-receiving end of the means for grounding are integral.

9. The flange structure of claim 7, wherein the hose-receiving end of the means for grounding is engaged with the first end of the fuel port.

10. The flange structure of claim 9, wherein the hose-receiving end of the means for grounding is angled to facilitate insertion into the hose.

11. The flange structure of claim 10, wherein the hose-receiving end of the means for grounding includes an annular barb that is engaged with an inner wall of the hose.

12. The flange structure of claim 7, wherein the means for grounding is made entirely of metal.

* * * * *